J. K. TOMLINSON.
AUTO TIRE PROTECTOR.
APPLICATION FILED JAN. 9, 1914.

1,131,094.

Patented Mar. 9, 1915.
2 SHEETS—SHEET 1.

Witnesses

J. K. Tomlinson, Inventor
by C. A. Snow & Co.
Attorneys

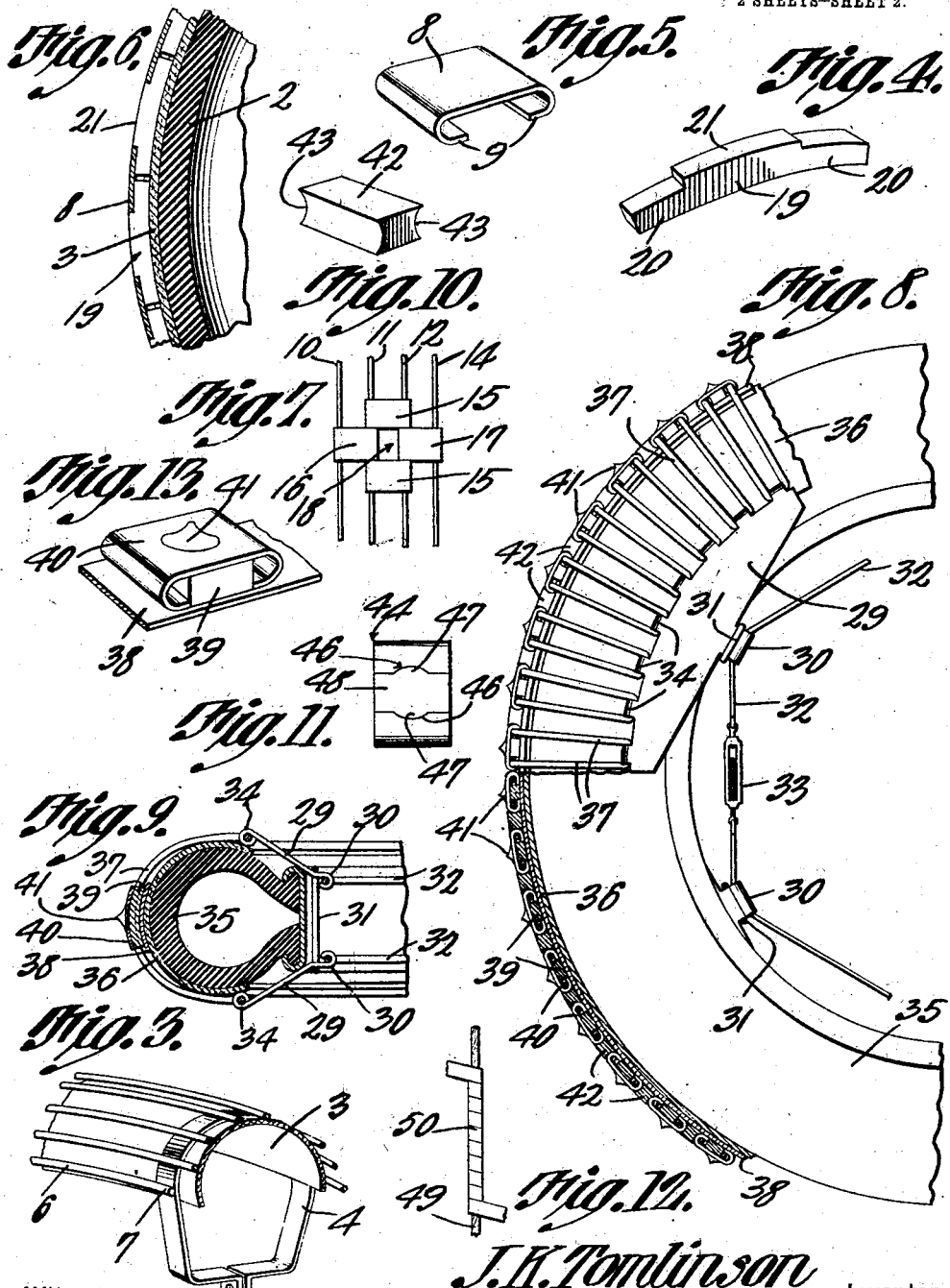

UNITED STATES PATENT OFFICE.

JOHN K. TOMLINSON, OF PICKAWAY, WEST VIRGINIA, ASSIGNOR OF ONE-THIRD TO ROBERT M. BELL, OF LEWISBURG, WEST VIRGINIA, AND ONE-TENTH TO J. J. TOWNLEY, OF RONCEVERTE, WEST VIRGINIA.

AUTO TIRE-PROTECTOR.

1,131,094. Specification of Letters Patent. Patented Mar. 9, 1915.

Application filed January 9, 1914. Serial No. 811,271.

*To all whom it may concern:*

Be it known that I, JOHN K. TOMLINSON, a citizen of the United States, residing at Pickaway, in the county of Monroe and State of West Virginia, have invented a new and useful Auto Tire-Protector, of which the following is a specification.

The device forming the subject matter of this application is a protector or shield for a vehicle tire.

One object of the present invention is to provide a device of this type in which the tread portion is formed from a single length of flexible material bent upon itself to form spaced parts, means being provided for connecting the said spaced parts.

Another object of the invention is to provide novel means for assembling the protector with the tire and for tightening up the protector.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
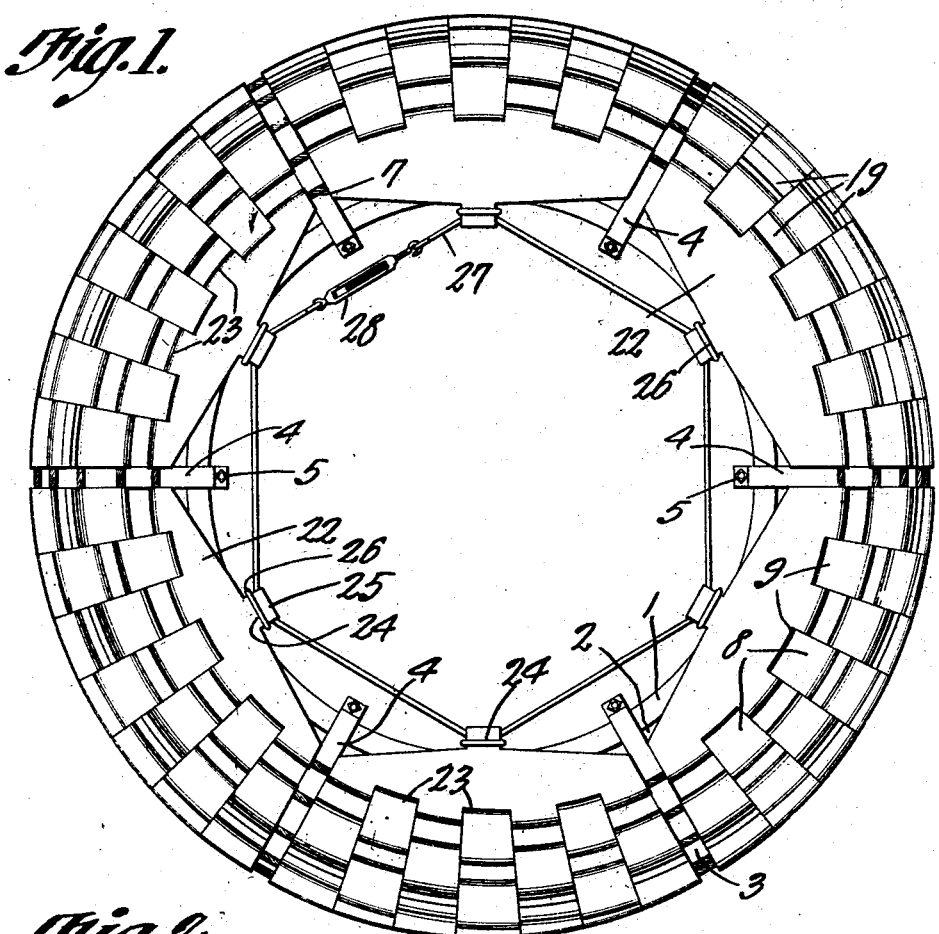
Figure 2:
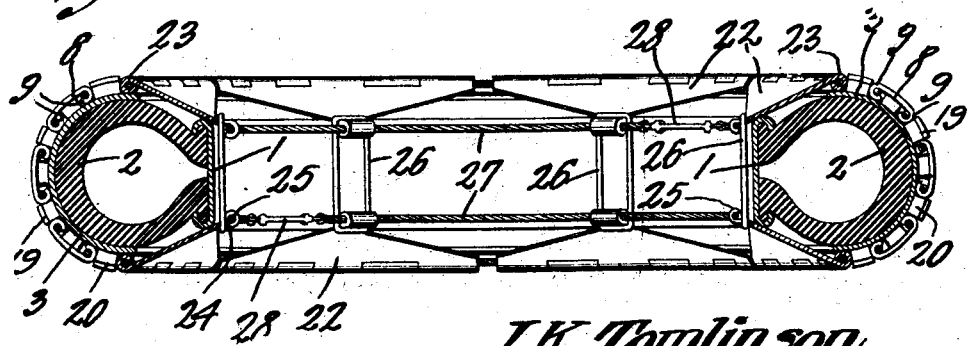

In the accompanying drawings:—Figure 1 shows one form of the invention in side elevation, parts being broken away; Fig. 2 is a transverse section of the structure shown in Fig. 1; Fig. 3 is a perspective illustrating one of the clips and attendant parts; Fig. 4 is a perspective view showing one of the fillers; Fig. 5 is a perspective view showing one of the cleats; Fig. 6 is a fragmental longitudinal section illustrating certain of the cleats and fillers in position; Fig. 7 is a diagrammatic top plan, fragmental in nature; Fig. 8 is a side elevation illustrating a modified form of the invention; Fig. 9 is a cross section of the structure shown in Fig. 8; Fig. 10 is a perspective of one of the fillers; Fig. 11 is a perspective showing a modified form of cleat and filler; Fig. 12 is a fragmental side elevation illustrating a modified form of the flexible element which forms the tread of the shield or protector; and Fig. 13 is a perspective view illustrating a portion of the cleat structure employed in Figs. 8 and 9.

Referring particularly to Figs. 1, 2, 3, 4, 5, 6 and 7, there is shown a rim 1 carrying a tire 2. Surrounding the tire 2 circumferentially is a base strip 3 which may be fashioned from felt. Extended across the base strip 3 are strips 4, the inner ends of which may be connected by bolts 5, so as to hold the base strip 3 on the tire 2. The tread portion of the protector is formed from a single strip of flexible material, which may be a cable. One end of this cable is secured as indicated at 7, and as shown most clearly in Fig. 3, to one of the clips 4. Thence, the flexible element 6 is carried around in spiral form, longitudinally of the protector, to form a plurality of approximately parallel convolutions, the other end of the flexible element 6 being connected with one of the clips 4, after the manner of the showing indicated at 7. The convolutions of the flexible element 6 are connected by transverse cleats 8, one of which is shown in Fig. 5, the cleats 8 being provided with hooked ends 9. In order to understand the application of the cleats 8 clearly, reference should be had to Fig. 7, wherein the numerals 10, 11, 12 and 14 designate successive convolutions of the flexible element 6. Any one pair of convolutions, say the convolutions 11 and 12 are connected by cleats 15 of the form hereinbefore described, one of the convolutions, as the convolution 11 being connected by the convolution 10 by a cleat 16 and the convolution 12 being connected with the convolution 14 by means of the cleat 17. From the foregoing it will be observed that the cleats 15 which connect any pair of convolutions as the convolutions 11 and 12 alternate with the cleats 16 which connect the convolution 11 with the convolution 10 and alternate with the cleats 17 which connect the convolution 12 with the convolution 14. Owing to this construction, a space exists between the ends of the cleats 16 and 17, and between the transverse edges of the cleats 15, which space is indicated at 18. If desired, the convolutions of the flexible element may be placed close enough together so that the inner ends of the clips or cleats 16 and 17 will be in engagement and then the opening 18 will no longer exist. When, however, as shown in the drawings, the parts are positioned as shown in Fig. 7, then recourse is had to a filler 19 which may be constructed as shown in Fig. 4. The filler 19 terminates in reduced ends 20 which extend beneath the cleats 15, as will be understood when Fig. 7 is compared with Fig. 6, each filler being provided with a projecting rib 21 which fills the opening 18. A plurality of side members 22 are provided, and any number of side members may be resorted to. The side members 22 preferably take the form of plates, the plates being disposed in pairs, and the members of the pairs being oppositely positioned, transversely of the structure. The side members 22 terminate in hook shaped fingers 23 engaged around the inner convolutions of the flexible element 6, as will be understood best from Fig. 2. Intermediate their ends and at their inner edges, the side members 22 are equipped with reduced tongues 24 terminated in inwardly extended, hook-shaped fingers 25, shown most clearly in Fig. 2. Links 26 or other suitable connecting means engage the tongues 24 of oppositely disposed side members 22, so as to hold the inner edges of opposed side members 22 in inclined relation and projecting toward the median plane of the structure, as will be appreciated from Fig. 2. With the fingers 25 are assembled flexible elements 27 in which are interposed turn buckles 28.

In applying the structure to the tire 2, the protector, generally considered, is placed around the tire, and the bolts 5 in the ends of the clips 4 are tightened up. The links 26 are slipped over the tongues 24 and the flexible elements 27 are engaged in the fingers 25, whereupon the turn buckles 28 may be adjusted to hold the protector securely upon the tire; all of which will be clearly understood from Figs. 1 and 2 of the drawing.

It will be observed that the foregoing structure, although possessing the necessary resiliency and flexibility will afford an adequate protection for the tire and for the spirally disposed flexible element, the clips or cleats 8 and the fillers 19 serving to protect the flexible element 6 and serving also to render the outer surface or tread face of the protector substantially unbroken and continuous.

The structure hereinbefore described extends around the tire in a single length. At times, however, it may be desirable to resort to a structure comprising a plurality of sections, the construction being such that any one section, when damaged, may be removed. With this end in view, the structure shown in Figs. 8 and 9 is resorted to.

In this form of the invention, the side members are indicated at 29, the same being provided with inwardly extended hook-shaped fingers 30, the fingers of opposed side members being united by links 31. The flexible elements 32, used as a contracting means, are employed and in these flexible elements 32 turn buckles 33 are interposed. In the edges of the side members 29, longitudinally spaced fingers 34 are formed. The tire is shown at 35 and the base strip at 36. A single flexible element for each pair of side plates 29 is provided. The flexible element is looped back and forth, transversely of the structure and is engaged with the hook-shaped fingers 34, the looped flexible element being shown at 37. The ends of the transversely looped flexible element may be secured to opposed side members 29. The construction, obviously is such that any pair of side members 29 and the corresponding looped flexible element 37 may be removed when these parts are damaged. It is therefore unnecessary to throw aside an entire protector when a section only thereof is injured. Extended circumferentially of the base strip 36 is a secondary strip 38 which, as shown in Fig. 13, may support blocks 39 extended within cleats 40, the cleats being employed to connect the convolutions of the looped flexible element 37. These cleats 40 extend longitudinally of the structure and may be provided with earth engaging studs 41. Between the curved end portions of the cleats 40 may be interposed fillers 42, the same having concaved lateral faces, adapted to coöperate with the hook-shaped ends of the cleats 40, the concavities above referred to being indicated at 43.

In Fig. 11, a modified form of cleat is shown. The cleats 44 resemble the cleats shown in Fig. 13, but, in the inner edges of the extremities of the cleats notches 46 are formed, the same being adapted to engage ribs 47 formed upon the filler blocks 48.

In Fig. 12 a slight modification of the invention is shown, wherein the flexible element 49 is shown as provided with a spiral metallic wrapping 50, the flexible element 49 being used as indicated at 37 in Fig. 8 or to form the spiral tread element represented by the reference characters 6 in Figs. 1 and 2.

Although the clips 4 shown in detail in Fig. 3 may be useful at times, they may be omitted if desired, since the flexible elements 6 are engaged by the cleats 8 and are thus held in place.

Having thus described the invention, what is claimed is:—

1. A tire protector comprising a plurality of strands; primary cleats connecting certain of the strands in pairs; secondary cleats disposed between the primary cleats and connecting the strands of said pairs respectively with other laterally disposed strands; and a filler having its ends inserted into the primary cleats, the filler including a projecting rib fitting in the space defined by the primary and secondary cleats.

2. A tire protector comprising a tread; opposed side plates attached to the longitudinal edges of the tread and provided with projecting tongues; open links engaged over the tongues of opposed plates; and circumferential tightening devices slidably engaged with the tongues of the plates upon opposite sides of the tread, the links lying between the longitudinal edges of the plates and the tightening devices.

In testimony that I claim the foregoing as my own, I have hereto affixed my signature in the presence of two witnesses.

JOHN K. TOMLINSON.

Witnesses:
 JOHN COOK,
 MASON B. LAWTON.